(No Model.)
J. R. OGDEN.
DANDY ROLL.
No. 352,484. Patented Nov. 9, 1886.
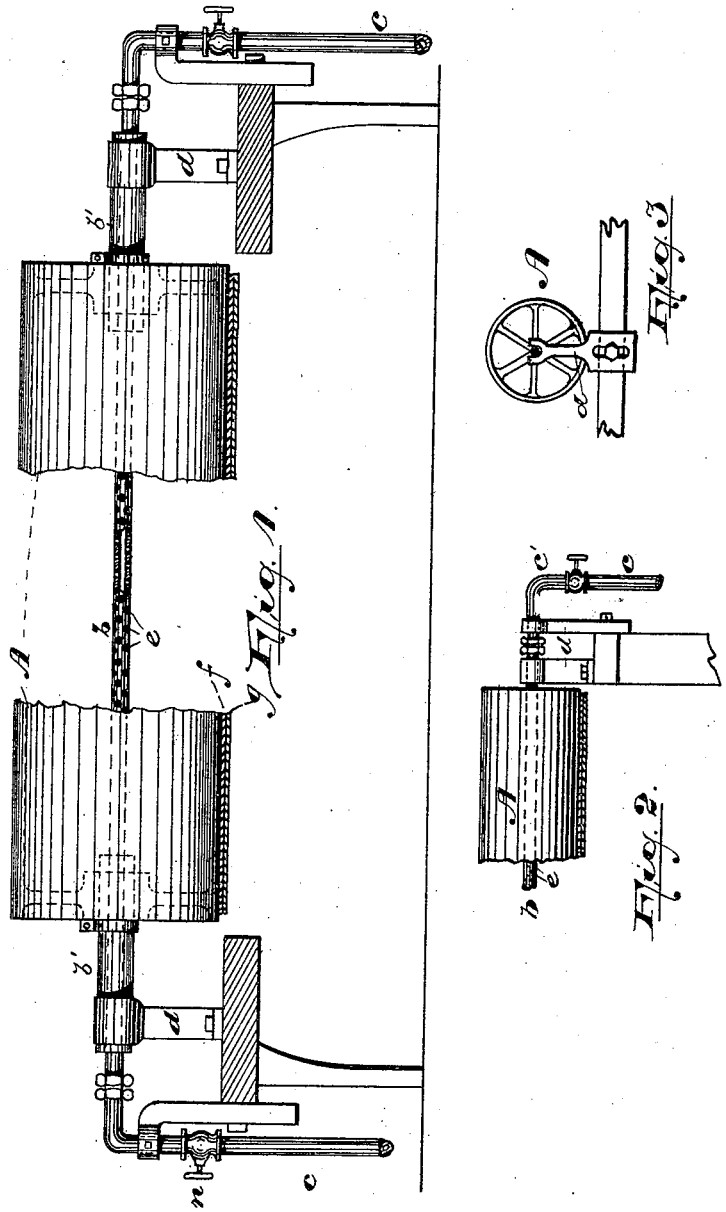
WITNESSES:
Fred C. Fraentzel.
Fredk. F. Campbell.
INVENTOR:
John R. Ogden,
BY Drake & Co., ATTYS.

United States Patent Office.

JOHN R. OGDEN, OF PALMER FALLS, N. Y., ASSIGNOR TO THE EASTWOOD WIRE MANUFACTURING COMPANY, OF BELLEVILLE, N. J.

DANDY-ROLL.

SPECIFICATION forming part of Letters Patent No. 352,484, dated November 9, 1886.

Application filed June 25, 1886. Serial No. 206,200. (No model.)

*To all whom it may concern:*

Be it known that I, JOHN R. OGDEN, a citizen of the United States, residing at Palmer Falls, in the county of Saratoga and State of New York, have invented certain new and useful Improvements in Dandy-Rolls; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to prevent the foamy mass or accumulation of pulp, size, clay, and other ingredients of paper which works through the meshes of the dandy-roll when in use from hardening on the inside of said roll and thus clogging the meshes, so that the paper beneath the roll is "crushed" and the mark produced by the said roll is rendered imperfect.

The invention consists in the arrangements and combinations of parts, substantially as will be hereinafter set forth, and finally embodied in the clauses of the claim.

Referring to the accompanying drawings, in which like letters refer to corresponding parts in each of the figures, Figure 1 is a front elevation of a machine embodying the invention, and Figs. 2 and 3 are views of a certain modified bearing for the dandy-roll.

In said drawings, A is the dandy-roll, which is formed in any ordinary manner. Said roll is arranged on a pipe or tube, $b$, which extends into the roll from a water-supply pipe, $c$, being coupled thereto by a rubber or other flexible or elastic tubing, $c'$, by means of which the said shaft may be allowed vertical play in its bearings $d$, so that the said roll may adjust itself to the paper $f$, lying on the ordinary wire-cloth $g$ of the machine. The said pipe or tube $b$ may be immovably arranged in tubular bearings $b'$, as in Fig. 1, though I prefer to have the movable construction above described. The said pipe or tube is, within the roll, provided with perforations $e\ e$, as in Fig. 1, which are preferably distributed so as to secure an even flow of water along the whole length of the roll, forming a spray in said roll, which prevents the hardening of the accumulating matter, so that it will again flow from the roll to the paper.

The water-supply pipe is preferably provided with a valve, $n$, by means of which the flow therethrough may be regulated or controlled.

Having thus described the invention, what I claim as new is—

1. A dandy-roll for use in paper-making, having a water-supply pipe leading into the interior thereof, substantially as and for the purposes set forth.

2. The dandy-roll for paper-making, having therein a spray-pipe by means of which the interior of said roll may be supplied with liquid, substantially as and for the purposes set forth.

3. In combination, the dandy-roll, perforated supply-pipe entering said roll, the said pipe having a flexible section, $c'$, in its course to allow for vertical play in the roll, substantially as set forth.

4. In combination, the dandy-roll, perforated pipe $b$, bearings $d\ d$, valve $n$, and supply-pipe $c\ c'$, substantially as and for the purposes set forth.

In testimony that I claim the foregoing I have hereunto set my hand this 17th day of June, 1886.

JOHN R. OGDEN.

Witnesses:
CHARLES SMITH,
THOS. F. WOODS.